(12) United States Patent
Tzeng

(10) Patent No.: US 6,252,872 B1
(45) Date of Patent: Jun. 26, 2001

(54) DATA PACKET FILTER USING CONTENTS ADDRESSABLE MEMORY (CAM) AND METHOD

(75) Inventor: Shrjie Tzeng, Fremont, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/578,070

(22) Filed: May 24, 2000

(51) Int. Cl.$^7$ ............................. H04L 12/50; H04L 12/28
(52) U.S. Cl. ..................... 370/360; 370/368; 370/391; 370/412
(58) Field of Search ...................... 370/363, 360, 370/368, 371, 374, 381, 390, 391, 392, 412, 449, 352, 395

(56) References Cited

U.S. PATENT DOCUMENTS

| | | | |
|---|---|---|---|
| 5,745,488 | * 4/1998 | Thompson et al. | 370/395 |
| 5,841,874 | * 11/1998 | Kempke et al. | 380/50 |
| 5,842,040 | 11/1998 | Hughes et al. | 370/428 |
| 5,920,886 | * 7/1999 | Feldmeier | 711/108 |
| 5,930,359 | * 7/1999 | Kempke et al. | 380/9 |
| 6,041,058 | 3/2000 | Flanders et al. | |

* cited by examiner

*Primary Examiner*—Wellington Chin
*Assistant Examiner*—Brenda Pham
(74) *Attorney, Agent, or Firm*—Renner, Otto, Boisselle & Sklar, LLP

(57) ABSTRACT

A method of identifying a target data packet from a series of data packets being received or transmitted by a communications device, each data packet having a series of data values. The method having the steps of establishing a condition for the target data packet, the condition having a particular data position value and an associated particular data value; storing the particular data position value in a first content addressable memory, the first content addressable memory receiving a value related to a data position of a data value and the first content addressable memory generating a position match indicator; storing the particular data value in a second content addressable memory, the second content addressable memory receiving the data value and the second content addressable memory generating the data value match indicator; comparing the position match indicator and the data value match indicator to determine if the condition for the target data packet has been satisfied by the transmitted data value. Also discussed are various embodiments of port filter devices to implement the method.

29 Claims, 11 Drawing Sheets

DATA PACKET FILTER USING CONTENTS ADDRESSABLE MEMORY (CAM) AND METHOD

TECHNICAL FIELD

The present invention generally relates to communication devices and, more particularly, to a port level data packet filter used to identify particular data packets.

BACKGROUND ART

There is an ever present demand for the efficient delivery of data packets between and among networked devices. Devices transmitting data packets include, but are not limited to, computers, telephones, local area networks, and wide area networks. The content of the data packets includes, but is not limited to, data signals, voice signals and video signals. Data packet delivery devices, including data packet switches (such as bridges and routers), modems and the like, are used to improve and facilitate the flow of data packets among the devices generating or transmitting the data packets.

Generally, each data packet has a series of frames. Each frame, or group of frames, specifies a certain characteristic of the data packet, such as communication protocol information, destination address, message content, etc. Each frame is also usually a specified number of bits long.

During data packet transmission, certain types of data packets can be selectively identified and specially handled based on attributes found in various frames of each data packet. Such identification of specific types of data packets is generally known as filtering. However, known filtering algorithms require processor intensive computations which may delay the transmission of the data packets and slow the flow of data within the network. Carrying out knowing filtering algorithms can also require a considerable amount of hardware.

SUMMARY OF THE INVENTION

According to one aspect of the invention, the invention is a method of identifying a target data packet from a series of data packets being received or transmitted by a communications device, each data packet having a series of data values. The method includes the steps of establishing at least one condition for the target data packet, each of the at least one condition specifying a particular data value being located in a particular position of the target data packet; determining whether a present data value from a data packet is located in the particular position specified by the condition and generating a position match indicator; determining whether the present data value contains the particular data value specified by the condition and generating a data value match indicator; comparing the position match indicator and the data value match indicator and generating a condition match indicator; and generating a positive evaluation result indicative of the presence of the target data packet when the condition match indicator for each of the a least one condition indicates that each of the at least one condition has been satisfied by the data packet.

According to another aspect of the invention, the invention is a method of identifying a target data packet from a series of data packets being received or transmitted by a communications device, each data packet having a series of data values. The method includes the steps of establishing a condition for the target data packet, the condition having a particular data position value and an associated particular data value; storing the particular data position value in a first content addressable memory, the first content addressable memory receiving a value related to a data position of a data value and the first content addressable memory generating a position match indicator; storing the particular data value in a second content addressable memory, the second content addressable memory receiving the data value and the second content addressable memory generating the data value match indicator; and comparing the position match indicator and the data value match indicator to determine if the condition for the target data packet has been satisfied by the transmitted data value.

According to another aspect of the invention, the invention is a port filter for identifying at least one target data packet. The port filter includes a first content addressable memory having a plurality of entries, the first content addressable memory storing a position value in each of the plurality of entry addresses; and a second content addressable memory having a plurality of entries, the second content addressable memory storing an expected data value in each of the plurality of entry addresses, the entries of the first content addressable memory and the second content addressable memory being logically paired such that the values stored in each pair of entries correspond to a condition used to identify the at least one target data packet.

BRIEF DESCRIPTION OF DRAWINGS

These and further features of the present invention will be apparent with reference to the following description and drawings, wherein.

DISCLOSURE OF INVENTION

Figure 1:
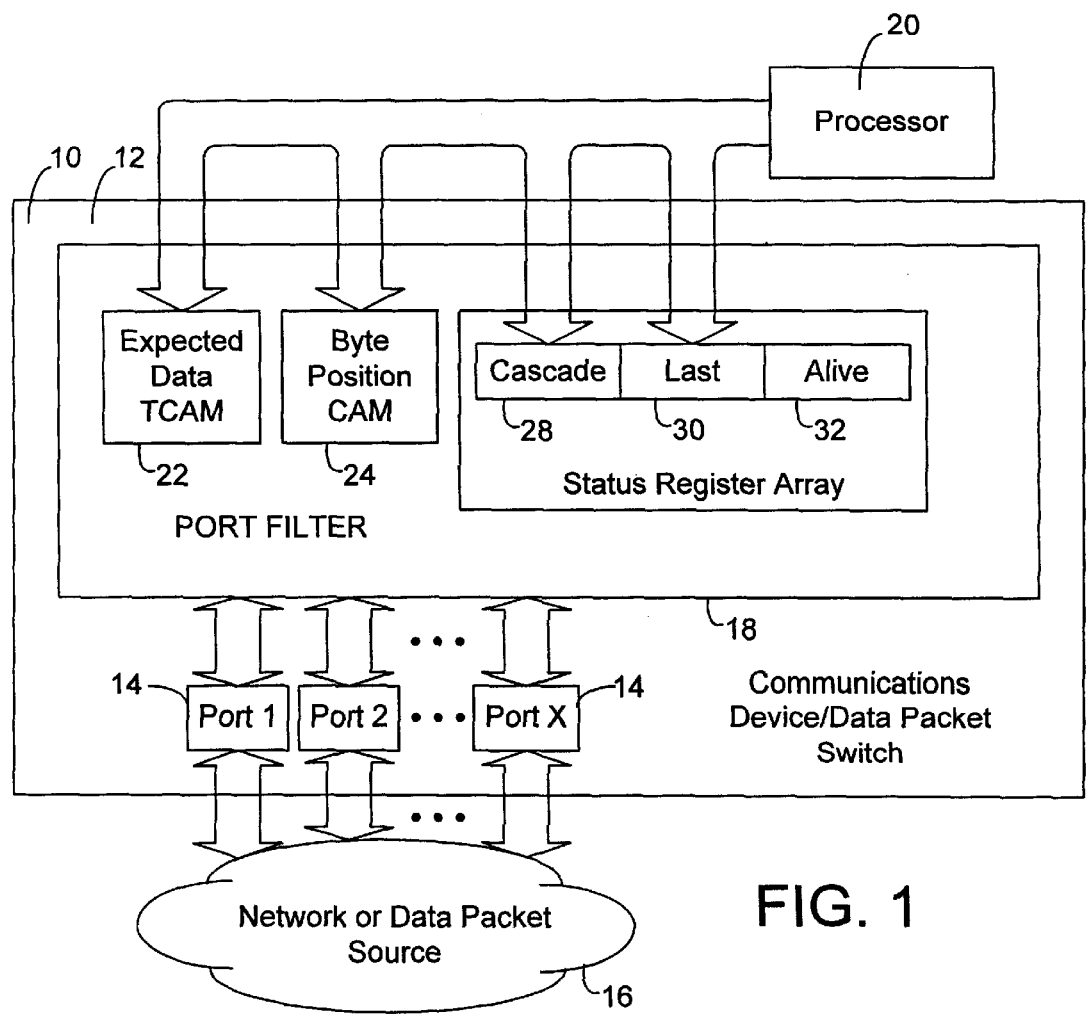
FIG. 1 is a block diagram of a communications device having a port filter according to the present invention.

In the detailed description which follows, identical components have been given the same reference numerals, regardless of whether they are shown in different embodiments of the present invention. To illustrate the present invention in a clear and concise manner, the drawings may not necessarily be to scale and certain features may be shown in somewhat schematic form.

Referring to FIG. 1, a communications device 10 for delivering data packets such as messages, cells, or a series of frames, is illustrated. The data packets may contain voice, video, and/or data information being transmitted from one device or network to another device or network. Example communications devices 10 include a data packet switch 12, such as a router or bridge, a telephone networking device, an internet gateway, a computer or the like. For simplicity, the communications device 10 will be referred to as a data packet switch 12. The data packet switch 12 has a plurality of ports 14 through which the data packets are transmitted to and from a network 16 or other type of data packet source, such as a computer, telephone or the like. Example types of ports 14 include 100 Mbps Ethernet ports and 1 Gbps Ethernet ports. In one example configuration, the data packet switch 12 has eight 100 Mbps Ethernet ports and in another example configuration, the data packet switch 12 has twelve 100 Mbps Ethernet ports and one 1 Gbps Ethernet port.

Each port 14 of the data packet switch 12 logically has a port filter 18 to filter the data packets transmitted through the port 14. However, the port filters 18 for each port 14 share common hardware. A speed matching scheme, as is known in the art, is used to time the flow of data through the port filter 18 hardware. Therefore, the port filter 18 can evaluate the data being transmitted through each port 14 while minimizing transmission delays or without transmission delays.

The port filter 18 can be programmed by a user with criteria for identifying a particular data packet or packets. The user may be interested in identifying certain types of data packets for a variety of reasons. For example, the user may wish to assign a higher delivery priority to the identified data packet than other types of packets or assign the identified data packet to an appropriate priority cue (not illustrated) or port 14. Data packet identification can also be used to prevent transmission of certain data packets, collect statistics regarding data packet volume and throughput, generate alerts to the user and/or track data packets with usage for the particular type of data packet. The ability to identify particular types of data packets is particularly useful when the packet switch 12 is responsible for delivering diverse types of information, such as voice and hypertext transfer protocol (HTTP) packets, so that the proper attention can be given to each type of packet. HTTP data packets are used to carry out requests from a software application, such as an Internet browser, to a server and to transport information or pages from the server back to the requesting browser software. Alternatively, the user may be interested in identifying simple mail transport protocol (SNMP) packets or voice data packets.

Using a processor 20 having a graphical user interface (GUI), the user can specify the packets that the user wishes to identify by populating templates with criteria related to the target data packet. The specification process can be as simple as selecting certain types of data packets presented to the user in a selection menu. Alternatively, the user can input specific information regarding the target data packets, such as expected data packet content at a particular byte position, or location, in the data packet. A software routine translates the user's raw input information (i.e., menu selections and/or data packet content information) into port filter template information. The port filter template information is provided to the port filter 18 and used by the port filter to identify the target data packets as discussed more fully below.

Generally, the port filter 18 operates as follows. As a data packet is transmitted through a particular port 14 of the data packet switch 12, the port filter 18 reads the data stream. If a match occurs between the data values contained in the data stream and all of the conditions specified in the port filter template information for a target data packet (i.e., one or more data values appearing in corresponding locations or specified frames), then the target packet has been identified. Once a target data packet is identified, the port filter 18 will then take steps as is appropriate upon the arrival of the identified target data packet. For example, the port filter 18 can tag the data packet with a header. The header is recognizable by other data packet transmission elements which act on a value contained in the header, thereby offloading any processing of the data packet to the other data packet transmission element. Alternatively, the port filter 18 can be configured to inform an other data packet transmission element when a target data packet arrives and the other data packet transmission element can be tasked with adding a header, modifying an existing frame value, or the like. Once the data packet is acted upon, the header can be stripped from the data packet if appropriate. The port filter 18 can also be configured to transmit an alert to the processor 20 or other device, such a user's terminal.

In one embodiment (discussed in more detail below with respect to FIG. 11), the port filter 18 uses a logic architecture to quickly filter data packets with no processor computations, thereby reducing the likelihood that the port filter 18 will delay transmission of the data packets or slow the flow of data through the network 16. More specifically, the port filter 18 employs content addressable memories, or CAMs, to quickly determine whether a target data packet has been received by the data packet switch 12. It is noted that the received data packet can be an inbound data packet from the network 16 or an outbound data packet being sent to the network 16. Accordingly, the port filter 18 is particularly useful in switches implementing layer 3 (network layer) or layer 4 (transport layer) of the open systems interconnect (OSI) model protocol stack. It is noted that the processor 20 is used only to configure the port filter 18.

The port filter 18 is provided with memory arrays to store the port filter template information provided by the processor 20. The memories of the port filter 18 include an expected data ternary content addressable memory (TCAM) 22, a data position content addressable memory (CAM) 24 (also referred to herein as a byte position CAM 24) and a status register array 26. The status register array 26 has three sub-arrays, including a cascade array 28, a last array 30 and an alive array 32. The expected data TCAM 22, the byte position CAM 24, the cascade array 28 and the last array 30 are populated with register input/output (IO) commands from the processor 20. As will be discussed in more detail below, the alive array 32 is not populated with register I/O commands from the processor 20. Rather, the alive array is populated with default values.

Content addressable memories, or CAMs, are well known in the art, but will be briefly described. A CAM is a memory of the type that can store a series of data values. Each data value is stored in a corresponding register (also referred to herein as an entry). For a traditional CAM, each bit of each stored data value must have a value of logical one or logical zero. When an input data value is presented to the CAM, the CAM will parallelly compare the input data value with each stored data value. If the input data value matches any of the stored data values, the CAM will output an indication of the presence of matching input data. Alternatively, the CAM can be configured to output register address information relating to the matched stored data value. The CAM can also be configured to indicate the absence of matching input data. Generally, the CAM requires that the input data completely matches with one of the stored data values. For example, if a CAM has 64 registers, each storing a six bit value, the input data must contain the same six bit value as one of the values stored in the 64 registers to generate a positive match result.

Another type of CAM, referred to as a ternary CAM (TCAM), allows the user to specify any of a logical one, a logical zero or a "don't care" value (commonly referred to as "x") for each bit of a stored data value. This gives the user greater flexibility in storing data values that will generate a match for various input data values. For example, if a TCAM register is used to store the value xx0110, input data values of 000110, 010110, 100110 and 110110 will generate a positive match result. However, input data values which do not exactly match the last four bits (e.g., a data value of 001010) will not generate a positive match result.

The byte position CAM 24 can be implemented with a standard CAM since the value of each byte position of data contained within a data packet can be expressed as an integral value. The expected data TCAM 22 can be implemented with a standard CAM, but a TCAM is preferred. Implementing the expected data TCAM 22 with a TCAM has the advantage of being able to specify all or only a portion of a data value being located at a particular byte position, allowing the user to use a partial byte value to determine the nature of a data packet. The expected data TCAM 22 can be sized, for example, to have 1024 eight bit entries and the corresponding byte position CAM 24 can have 1024 corresponding entries, each entry being six bits long. In an alternative example, the expected data TCAM 22 can have 512 sixteen bit entries and the corresponding byte position CAM 24 can have 512 four bit entries.

Figure 2:
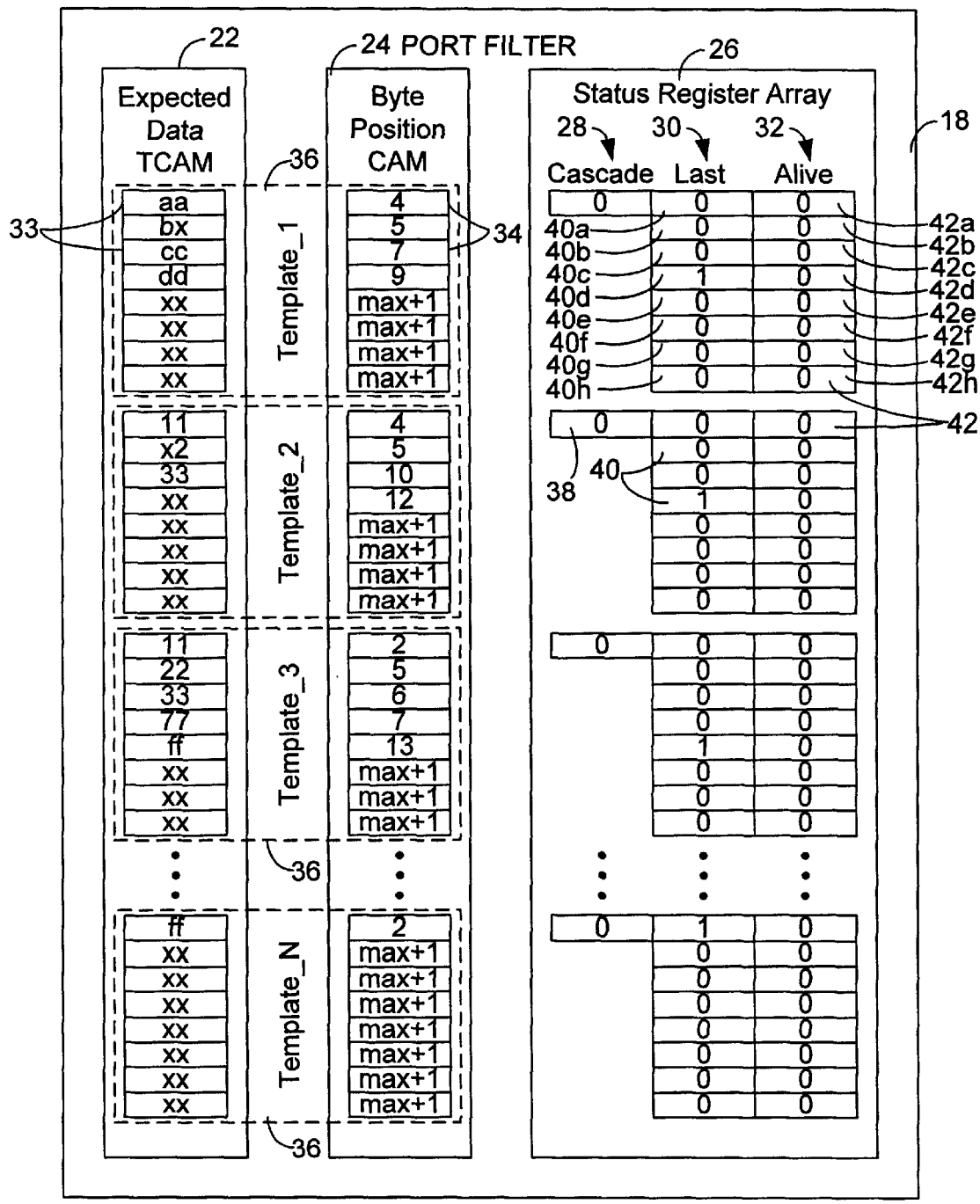
FIG. 2 is a schematic diagram of memory components for the port filter.

With additional reference to FIG. 2, the registers of the port filter 18 are illustrated. The expected data TCAM 22 has a series of entries 33 and the byte position CAM 24 has a series of entries 34. A set of corresponding pairs of entries 33, 34 for the expected data TCAM 22 and the byte position CAM 24 are grouped together into templates 36. The illustrated port filter 18 is an example where the port filter 18 pairs the first 8 entries 33 of the expected data TCAM 22 with the first 8 entries 34 of the byte position CAM 24 into a first template, or template_1. Each subsequent grouping of 8 entries 33, 34 for the expected data TCAM 22 and the byte position CAM 24 respectively are grouped into templates 36, up to a last template, or template_N. An example port filter 18 can have a total of 1,024 entries in each of the TCAM 22 and the CAM 24, the entries 33, 34 being grouped eight pairs of entries 33, 34 at a time for a total of 128 templates 36.

The entries 33 of the expected data TCAM 22 are used to store data values one would expect to be present in the target data packet(s) being received by the data packet switch 12. As mentioned above, the data value for each entry 33 of the expected data TCAM 22 can be made up of any combination of bit values, each bit value having being a logical one, a logical zero or don't care.

Each expected data value stored in the expected value TCAM 22 has a corresponding location value stored in the byte position CAM 24. In a preferred embodiment, the corresponding location value indicates a byte position within the data packet. However, the location value can alternatively be used to identify a particular frame, a particular set of bits, or a particular set of bytes. The preferred embodiment of the port filter 18 simultaneously checks for a match between the incoming data value and one of the stored values in the expected value TCAM 22 and for a match between a location value of the incoming data value and one of the stored values in the byte position CAM 24. If the entries 33 and 34 for a corresponding pair of entries 33, 34 each produces a match, the condition specified by that pair of entries 33, 34 is satisfied. In an alternative embodiment, the port filter 18 can use information from each entry 34 of the byte position CAM 24 to identify where in the data packet the port filter 18 is to look for the expected data value stored in the corresponding entry 33 of the expected data TCAM 22.

One skilled in the art will recognize that the user can use the processor 20 to store values in a corresponding pair of entries 33, 34 of the expected data TCAM 22 and the byte position CAM 24 to identify, for example, a particular four bit internet protocol (IP) field within an IP header. In another example, a corresponding pair of entries 33, 34 can be used to identify a particular subnet to which the data packet is being delivered.

For each template 36, the cascade array 28 has one register, or entry 38. For each template, the last array 30 has a register, or entry 40 (labeled 40a, 40b, etc.), for each pair of entries 33, 34 from the expected data TCAM 22 and the byte position CAM 24. For each template, the alive array 32 has a register, or entry 42 (labeled 42a, 42b, etc.), for each pair of entries 33, 34 from the expected data TCAM 22 and the byte position CAM 24.

The values stored in corresponding pairs of entries 33,34 in each template 36 describe a condition related to the data packet to be identified. A particular data packet, or class of data packets, may be identifiable using only one condition or may need several satisfied conditions to be identified. To reduce the amount of hardware and/or software resources needed for the port filter 18, the templates 36 are preferably limited to a specified number of pairs of entries 33, 34, such as the 8 pairs of entries 33, 34 illustrated in FIG. 2. In the illustrated embodiment, if more than 8 conditions are needed to identify a particular data packet the user and/or the processor 20 can cascade two adjacent templates 36 together to form a longer template. Cascading two adjacent templates 3 is done by setting the corresponding cascade bit of the second of the adjacent pairs of templates 36. The cascading of multiple templates 36 will described in more detail below.

For each condition relating to a particular data packet, the processor 20 will arrange the conditions in order of byte position from lowest to highest and populate each pair of entries 33, 34 of a template 36 with corresponding pairs of expected data values and byte position values. For a set of conditions used to identify a data packet with less than the maximum number of conditions defined by the template 36 (i.e., total number of pairs of entries 33, 34 for the template 36), the processor 20 will not store any data values in the unused entries 33 of the template 36. The expected value TCAM 22 will populate each bit of the unused entries 33 with default values. As will be more apparent below, the actual values of the default values for the unused entries 33 will not be of any consequence. In the corresponding unused entries 34 of the byte position CAM 24, the processor 20 will store a value corresponding to one higher than the maximum number of positions allowable per data packet (e.g., maximum transfer unit or MTU) expected to be transmitted by the data packet switch 12. The maximum number of positions, or MTU, is defined by the underlying communication protocol of the data packet switch 12. It is noted that the illustrated values for the entries 33, 34 are exemplary. One skilled in the art will recognize that the memory arrays of the port filter 18 will be populated with binary values used to represent values relating to the target data packet(s). However, an "x" appearing in the illustrated example represents a don't care value.

The processor 20 will also set all of the bits in the entries 40 of the last array 30 to logical zero except for the entry 40 corresponding to the last pair of entries 33, 34 of the template 36 (or cascaded templates 36 if applicable) populated with an expected data value. The entry 40 corresponding to the last pair of entries 33, 34 of the template 36 populated with an expected data value is set to logical one. At power up, all of the entries 42 of the alive array 32 will be set to a default value of logical zero.

Figure 3:
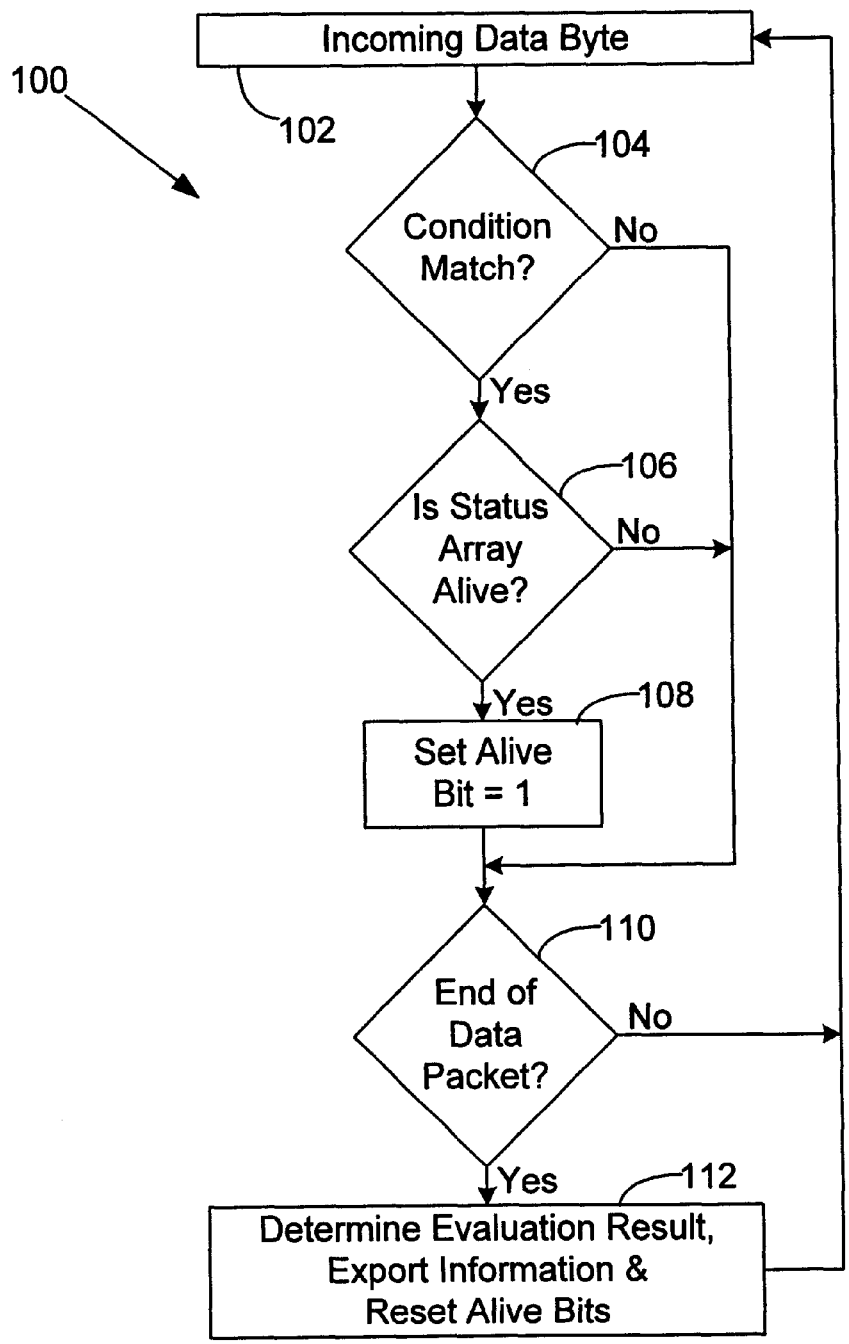
FIG. 3 is a flowchart representing an example logic flow of the port filter.

Turning to FIG. 3, a port filter logic 100 for the port filter 18 is illustrated. Each template 36 is evaluated simultaneously according to the port filter logic 100 to determine if the conditions indicated by the values stored in the pairs of entries 33, 34 for each template (or multiple templates cascaded together) are met as data packets are transmitted through each port 14. As the stream of data bytes which make up the data packet is transmitted by the data packet switch 12, the data packets are processed by the port filter beginning in step 102. It is noted that processing conducted outside the port filter 18, such as by a media access control (MAC) layer, will provide a byte position value for each byte of the incoming data and an end of packet signal. Alternatively, the port filer 18 can count the byte of a data packet to derive the byte position values.

In step 104, the presently incoming data byte is evaluated to determine whether the data byte satisfies the condition specified by a corresponding pair of entries 33, 34. More specifically, the byte position CAM 24 is used to determine whether the byte position value of the incoming data byte matches any of the byte position values stored in the entries 34 of the byte position CAM 24. Simultaneously, the expected data TCAM 22 will determine whether the data value of the incoming data byte corresponds to any of the expected data values stored in the entries 33 of the expected data TCAM 22. If any match generated by the byte position CAM 24 corresponds to any match of the expected data TCAM 22 thereby satisfying a condition specified by a corresponding pair of entries 33, 34, then a condition match for the data byte has been made in step 104.

If a condition match has occurred in step 104, then the port filter logic 100 will proceed to step 106 to determine whether the status array 26 for the template generating the condition match in step 104 is alive or dead. Conceptually, the alive/dead determination is made as follows. If the entry 42 corresponding to the matching pair of entries 33, 34 from step 104 is a first alive entry 42a, then the port filter 18 will look to the cascade entry 38 for the template 36. If the value of the cascade entry 38 is logical zero, the template will be considered alive by default. If the value of the cascade entry 38 is logical one (to combine the present template with the prior template), the port filter 18 will look to the final alive entry (e.g., alive entry 42h) from the preceding template. If this prior alive entry 42 has a value of logical one, the template will be considered alive. If this prior alive entry 42 has a value of logical zero, the template will be considered dead. If the entry 42 corresponding to the matching pair of entries 33, 34 from step 104 is higher than the first alive entry 42a (i.e., entry 42b and up), then a determination of whether the status register array 26 is presently alive is made by analyzing the value stored in the preceding entry 42 of the alive array 32. If the value is logical low, the status array 26 for the template 36 being evaluated is considered dead. However, if the value is logical high the status array for the template 36 being evaluated is considered alive.

If the status array 26 for the template is alive in step 106, the port filter logic 100 will set the entry 42 of the alive array 32 corresponding to the matching pair of entries 33, 34 from step 104 to logical one in step 108.

Next, the port filter logic 100 will determine whether the end of the data packet has been reached by checking the end of packet signal in step 110. In addition, if no condition specified by a corresponding pair of entries 33, 34 is satisfied by the data byte in step 104, then a condition match is not made and the port filter logic 100 will also proceed to step 110. In addition, if in step 106 the template 36 is dead, the port filter logic 100 will also proceed to step 110. If the end of the data packet has not been reached, the port filter logic 100 will return to step 102 to await the arrival of the next data value.

However, if the end of the data packet has been reached, the port filter logic 100 will proceed to step 112 to determine an evaluation result for each template 36 at the same time. The port filter 18 will simultaneously generate a positive evaluation result for each template 36 having all of the conditions stored by the template 36 matched by the incoming data byte(s). A positive evaluation result indicates that a target data packet has been identified. Conceptually, a positive evaluation result is found when the status array 26 for the template 36 is alive for all alive entries 42 up to and including the alive entry 42 corresponding to the last entry 40 which has been set to logical one. However, the port filter 18 can be programmed to check only the last entry 40 having a logical one with the corresponding alive entry 42 to generate the evaluation result. The port filter 18 will generate a negative evaluation result for each template where none or less than all of the conditions stored by the template 36 have been matched by the incoming data byte(s). The positive evaluation result can be implemented by setting a logical bit value. Alternatively, the positive evaluation result can be a signal having information related to the target data packet or the template 36 that identified the target data packet. In a preferred embodiment, the processor 20 is used to specify to the data packet switch 12 the action to be taken for each matched template 36.

If the evaluation result is positive, the port filter 18 will perform one or more specified actions. The actions include, tagging the data packet for identification by another data packet transmission element, modifying or adding a header to the data packet, setting a field in the data packet, deleting the data packet, routing the data packet to a particular address or through a particular port 14, routing the data packet through a higher or lower priority queue, exporting the evaluation result to other elements of the communications device 10, the processor 20 and/or another computing device, and so forth. In step 112, the port filter logic 100 will also reset the entries 42 of the alive array 32 to their default values of logical zero so that new data packets can be evaluated by the template 36.

It is noted that the illustrated port filter logic 100 is an example and many other similar port filter logic routines to identify a target data packet fall within the scope of the present invention. For example, the byte position CAM 24 can make a position value match determination, and if this result is positive, the expected data CAM 22 is then used to make a data value match determination.

Figure 4A:
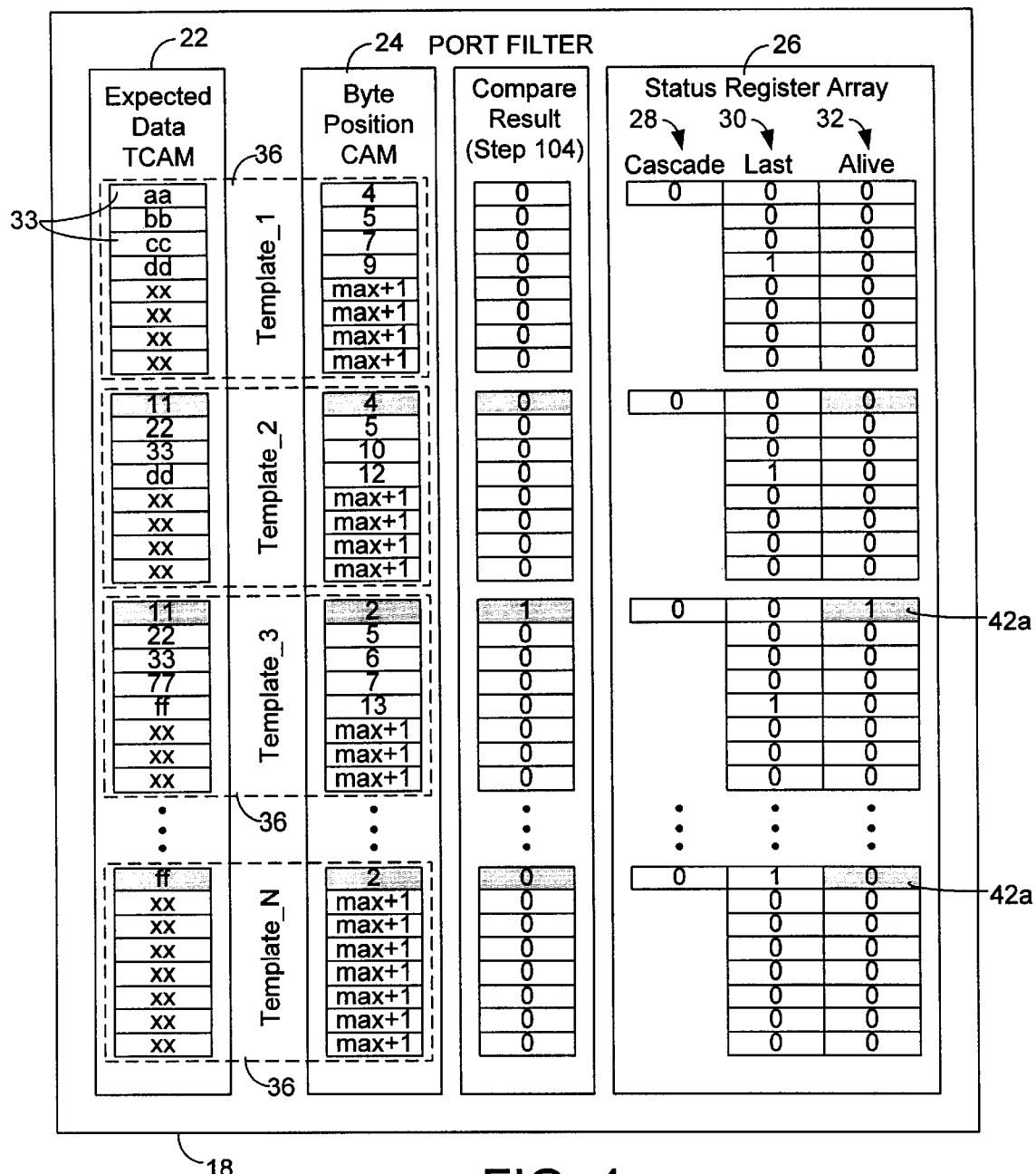
FIGS. 4a and 4b are respectively a schematic diagram of the port filter memory components and a data stream illustrating the operation of the port filter during receipt of a particular data value at a particular byte position.
Figure 4B:
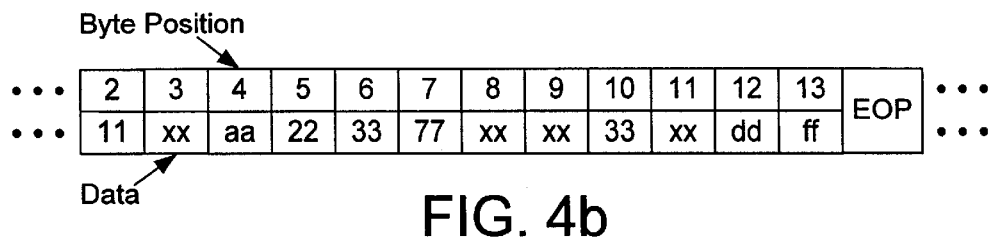

Referring now to FIGS. 4a and 4b the operation of the port filter 18 will be described using an example stream of data (illustrated in FIG. 4b) and an example port filter 18 populated with conditions specified by a user (illustrated in FIG. 4a). In template_1, the user has specified that the target data packet has a data value of aa in byte location 4, data value bb in location 5, data value cc in location 7 and data value dd in location 9. The unused portion of template_1 (and unused portions of subsequent templates 36) will be populated with default TCAM values and maximum data packet length plus one values as described in more detail above. Template_2 has been populated to expect data value 11 in location 4, data value 22 in location 5, data value 33 in location 10, and data value dd in location 12. Template_3 has been populated to expect data value 11 in location 2, data value 22 in location 5, data value 33 in location 6, data value 77 in location 7, and data value ff in location 13. The last template, or template_N, has been populated with data value ff in location 2.

The top row illustrated in FIG. 4b represents byte locations. The bottom row of FIG. 4b represents data values associated with the corresponding byte position of the top row. In FIGS. 4a and 4b, the data value associated with the second byte position is presently being processed by the port 14 associated with the port filter 18 (step 102). In illustrating the example, the byte position (FIG. 4b) and data value (FIG. 4b) and the operationally active entries 33, 34 (FIG. 4a) and entries 42 (FIG. 4a) have been shaded. In illustrating the example, the compare result generate in step 104 is also included in FIGS. 4a, 5a, 6a, 7a, 8a, and 9a. Any operationally active compare results have also been shaded.

As the data value associated with the second byte position is processed by the port filter 18, the port filter logic 100 will determine whether the byte position value stored in any entry 34 of the byte position CAM 24 has the same value as the incoming data byte position. In this example, the first entry 34 of the template_3 and the first entry 34 of template_N have been populated with byte position values matching the incoming byte position. The associated expected data value stored in the corresponding entry 33 of template_3 has a value of 11. This matches the value of the actual incoming data value in the second byte position. Therefore, the compare result (step 104) will be positive, or a logical one and the port filter 18 will check to see if the status register array associated with template_3 is alive (step 106). Since the active entries 33, 34 for template_3 are the first entries, the cascade entry 38 will be checked for the template's alive/dead status. Since a logical zero is found in the cascade entry 38 for template_3, the port filter 18 will modify the first alive entry 42a by setting the first alive entry 42a to logical one (step 108).

The alive array 33 for template_N will not be modified since the data value from the actual data stream does not match the data value stored in the first entry 33 of the expected data TCAM 22 for template_N. Therefore, the first alive entry 42a of the status register array 26 for template_N will remain zero. With respect to template_2, the expected data TCAM 22 will generate a match for the value 11, but the byte position CAM 24 will not generate a match resulting in a compare result of zero in step 104 and no change in the alive array 32 for template_2 will be made.

Figure 5A:
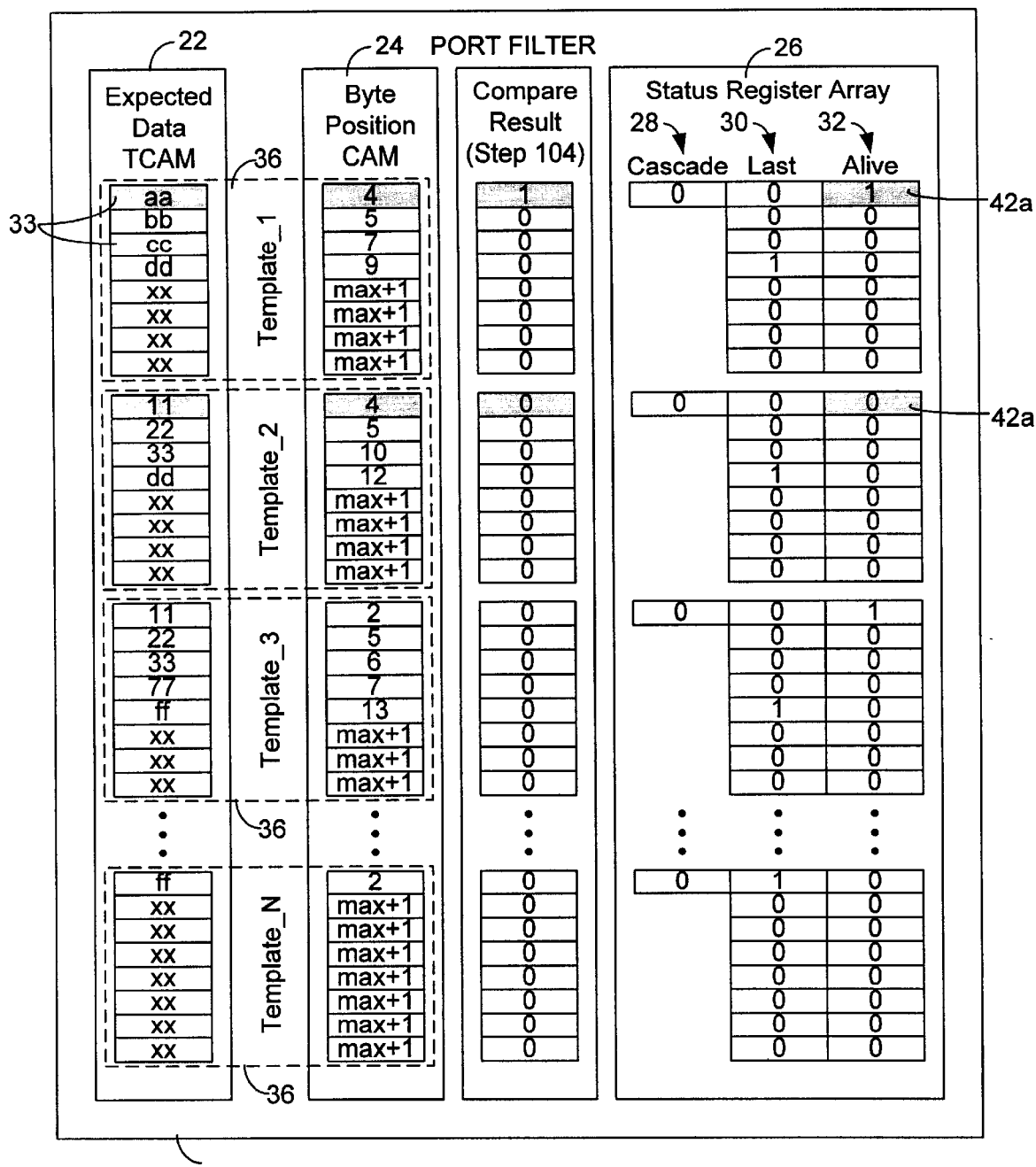
FIGS. 5a and 5b are respectively a schematic diagram of the port filter memory components and a data stream illustrating the operation of the port filter during receipt of a particular data value at a particular byte position.
Figure 5B:
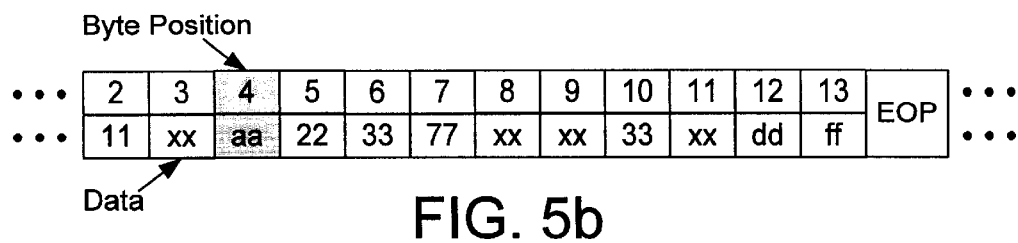

Referring now to FIGS. 5a and 5b, the example illustrated in FIGS. 4a and 4b will be continued with respect to data corresponding to a fourth byte position. It is noted that an in-depth discussion of the data value appearing at the third byte position is omitted since the third data position is not a byte position identified as a condition in any of the templates 36. Since the third byte position is not identified in any entry 34 of the byte position CAM 24, the port filter logic 100 (FIG. 3) will receive the incoming data byte in step 102 and ultimately return to step 102 since the comparison results in step 104 are all false and the end of the data packet has not been reached.

Returning to the example as illustrated in FIGS. 5a and 5b for the fourth byte position, the first entries 34 of the first and second templates (templates and template_2) match in the fourth byte position. For template_1, the expected data value and the actual data value match. This results in the first alive entry 42a being set to logical one for template_1.

Template_2, however, does not have a match between the incoming data and the expected data. Therefore, first alive entry 42a for template_2 will remain logical zero indicating that the data packet being transmitted is different from the conditions stored in template_2. The presence of a logical low in an alive register corresponding to the matched byte position entry 34 indicates to the port filter logic 100 that template_2 is dead, ultimately resulting in a negative evaluation result in step 112.

Figure 6A:
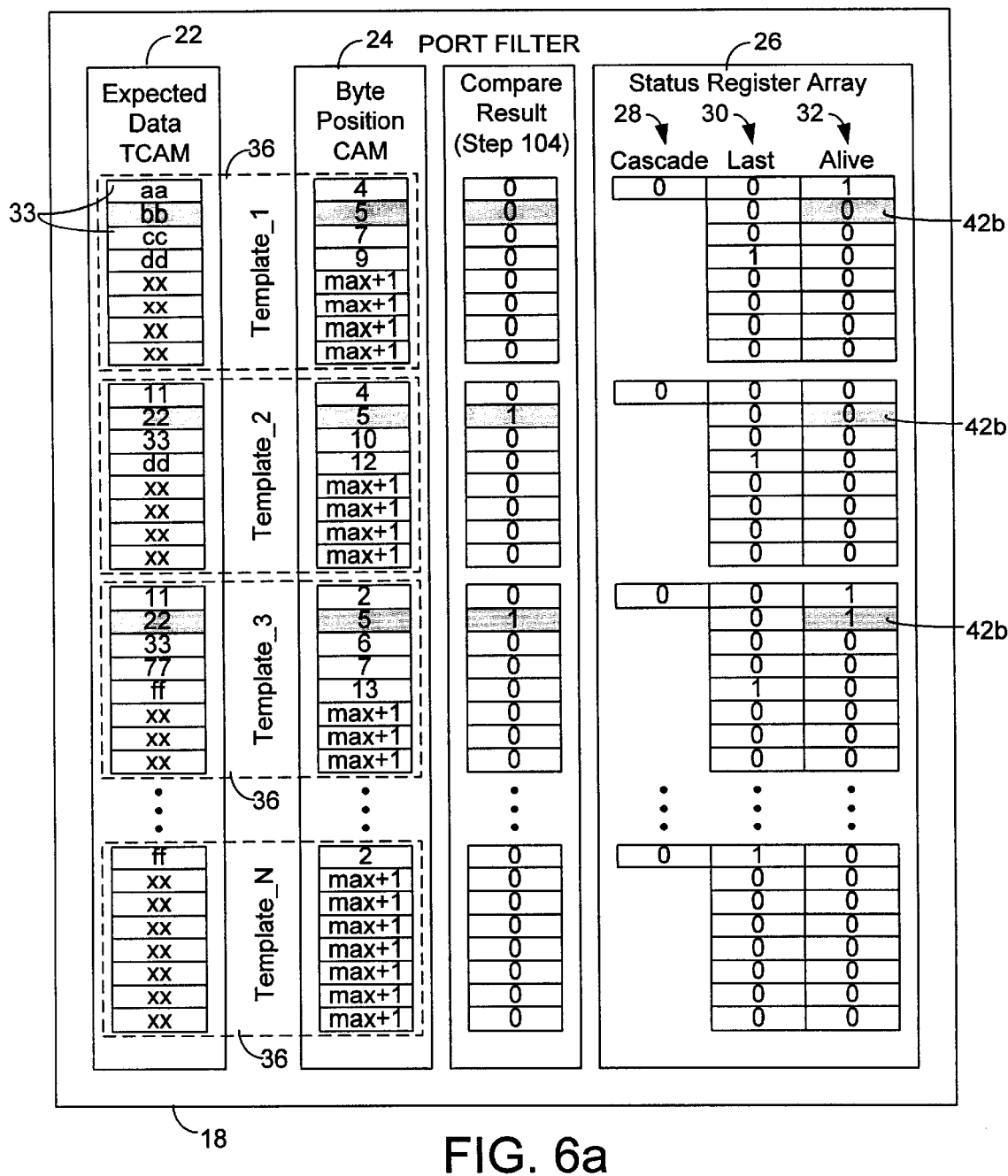
FIGS. 6a and 6b are respectively a schematic diagram of the port filter memory components and a data stream illustrating the operation of the port filter during receipt of a particular data value at a particular byte position.
Figure 6B:
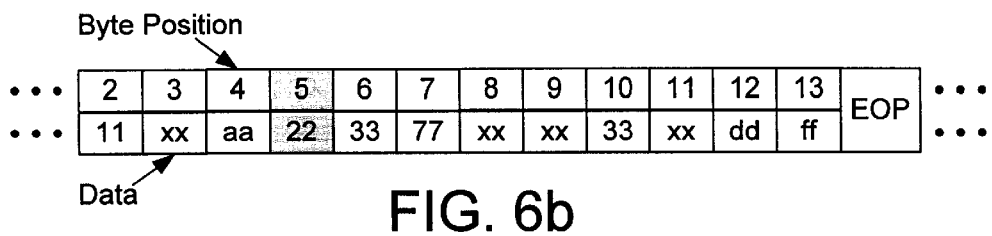

Referring now to FIGS. 6a and 6b, the example port filter 18 will be described as a data value of 22 arrives in the fifth byte position. Template_1 expects a value of bb in the fifth byte position. Therefore, the conditions specified the by the user in template_1 are not met and the corresponding alive register (alive entry 42b for template_1) will remain logical zero. This indicates that the status register array 26 for template_1 is dead.

The second entry 34 in template_2 is also expecting data in the fifth byte position and, in the example, the expected data matches the actual data value. However, when the port filter logic 100 checks whether the status array 26 for template_2 is alive in step 106, the port filter logic 100 will find that template_2 is dead and will not modify the associated alive entry 42b for template_2. The second alive entry 42b for template_3 will be set to logical one since template_3 is expecting the data value 22 in the fifth byte position.

Figure 7A:
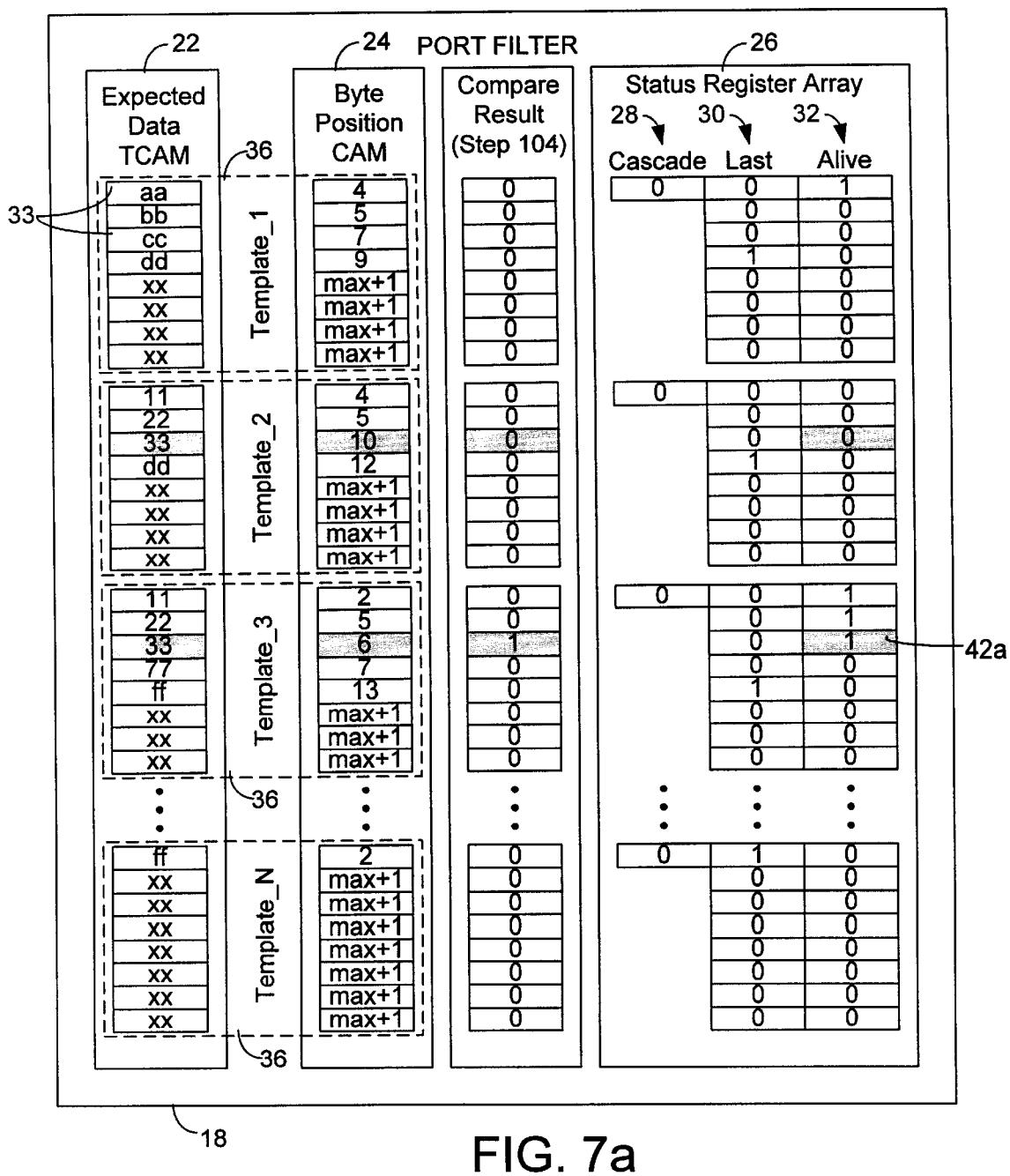
FIGS. 7a and 7b are respectively a schematic diagram of the port filter memory components and a data stream illustrating the operation of the port filter during receipt of a particular data value at a particular byte position.
Figure 7B:
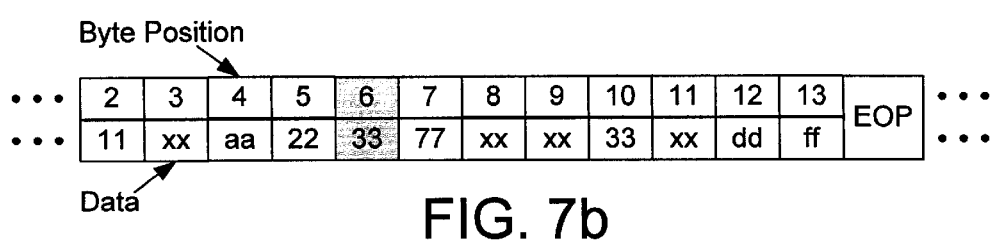

Turning to FIGS. 7a and 7b, the example port filter 18 is illustrated for the arrival of data value 33 in the sixth byte position. Template_3 is expecting this value in the sixth byte position and will update the third alive entry 42c for template_3 with a logical one. With respect to template_2, the expected data TCAM 22 will generate a match for the value 33, but the byte position CAM 24 will not generate a match resulting in a compare result of zero in step 104 and no change in the alive array 32 for template_2 will be made.

Figure 8A:
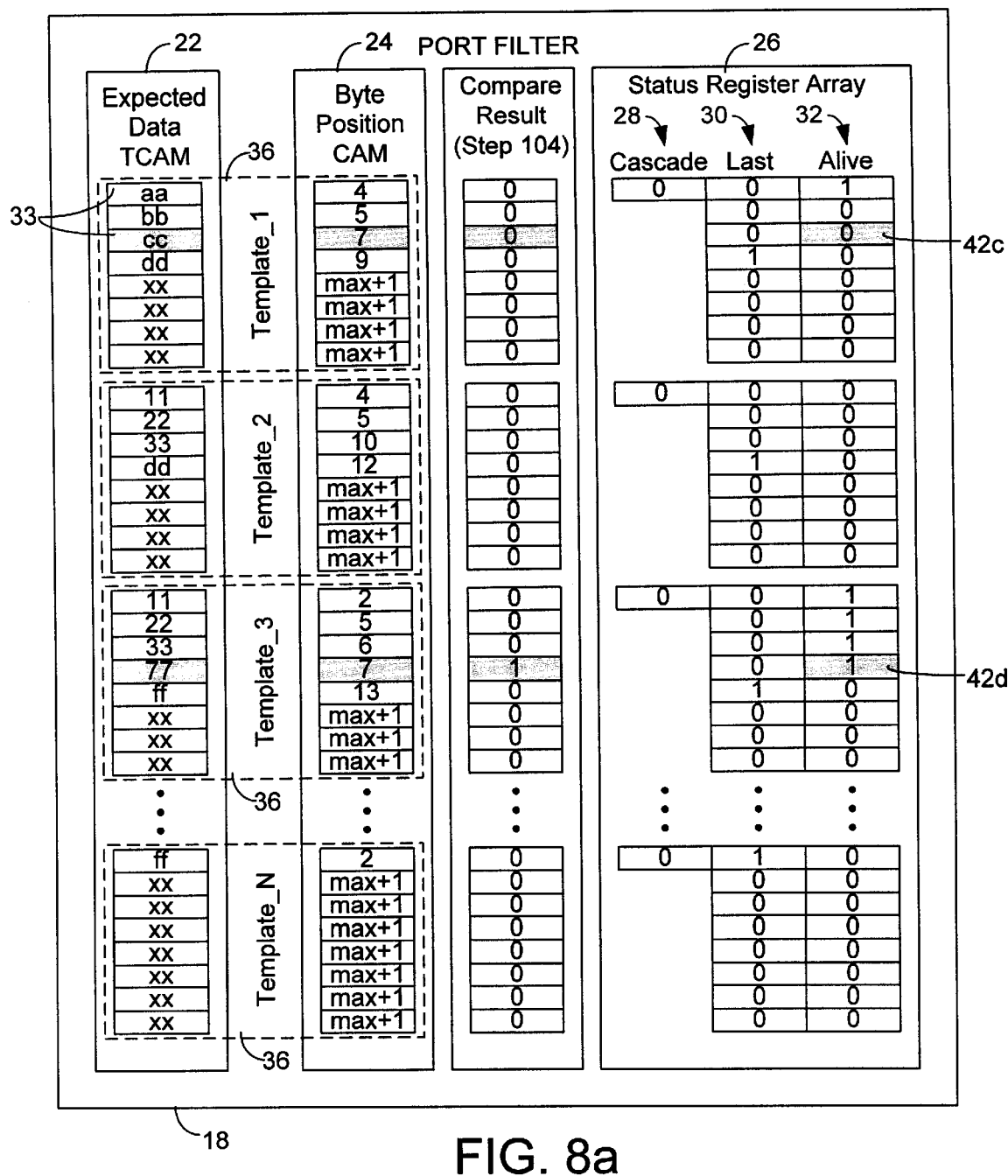
FIGS. 8a and 8b are respectively a schematic diagram of the port filter memory components and a data stream illustrating the operation of the port filter during receipt of a particular data value at a particular byte position.
Figure 8B:
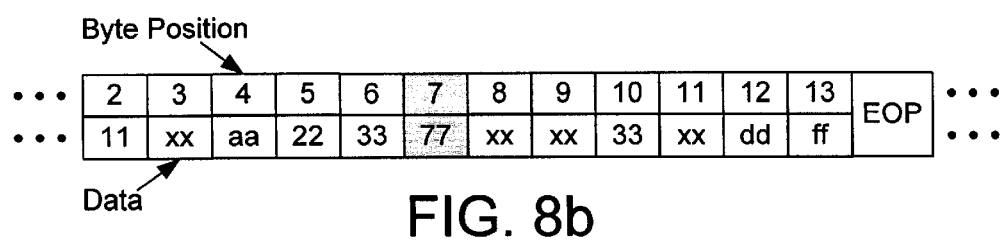

Turning to FIGS. 8a and 8b, the example port filter 18 is illustrated for the arrival of data value 77 in the seventh byte position. The first template is expecting data value cc in byte position seven, resulting in a compare result of logical zero in step 104. Therefore, the third alive entry 42c in the status register array 26 for template_1 will not be modified. Template_3 is expecting data value 77 in the seventh position, leading to a compare result in step 104 of logical one and, since the alive array 32 is still alive for template_3, the port filter logic 100 will set the fourth alive entry 42d of template_3 to logical one.

Figure 9A:
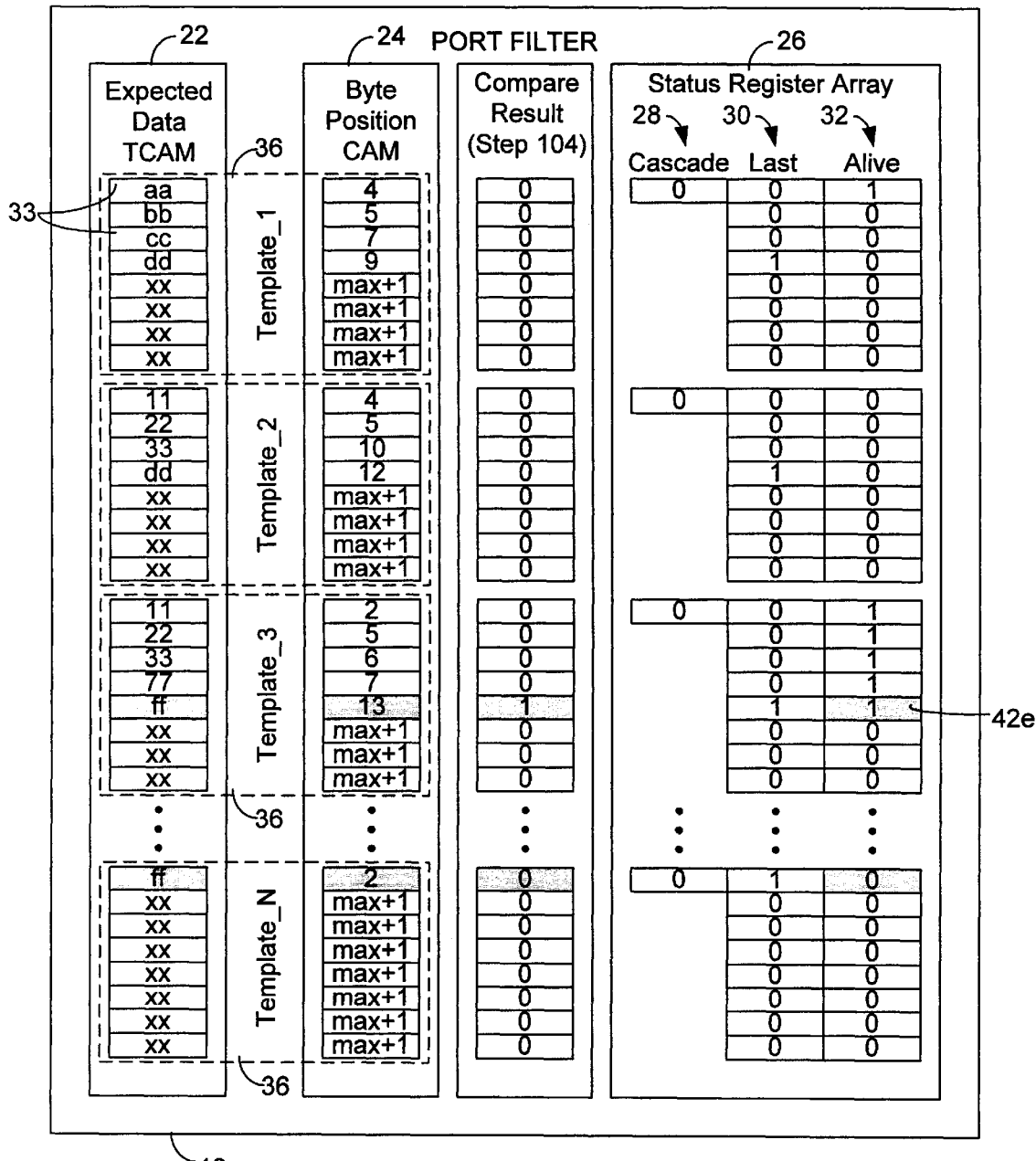
FIGS. 9a and 9b are respectively a schematic diagram of the port filter memory components and a data stream illustrating the operation of the port filter during receipt of a particular data value at a particular byte position.
Figure 9B:
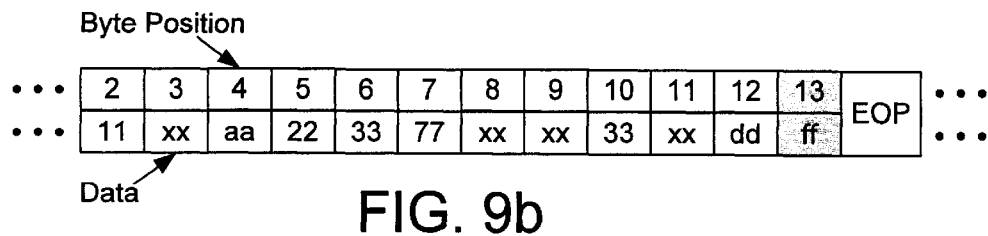

Turning to FIGS. 9a and 9b, the example port filter 18 is illustrated for the arrival of data value ff in the thirteenth byte position. It is noted that the port filter's operation for byte positions eight through twelve is not fully illustrated.

However, applying the foregoing logic 100, one skilled in the art will recognize that no changes to the status register 26 will be made upon the arrival of these data bytes.

Upon the arrival of the value ff at the thirteenth byte position, the port filter logic 100 for template_3 will have a positive compare result in step 104 and will update the fifth alive entry 42e with a logical one in step 108. With respect to template_N, the expected data TCAM 22 will generate a match for the value ff, but the byte position CAM 24 will not generate a match resulting in a compare result of zero in step 104 and no change in the alive array 32 for template_N will be made.

When all the data bytes for the data packet have been transmitted, the MAC layer will send an end of packet (EOP) signal to the port filter 18. Upon receiving the EOP signal, the port filter 18 will generate the evaluation result for each template by strobing, or sampling, an evaluation result of the port filter 10.

Figure 10:
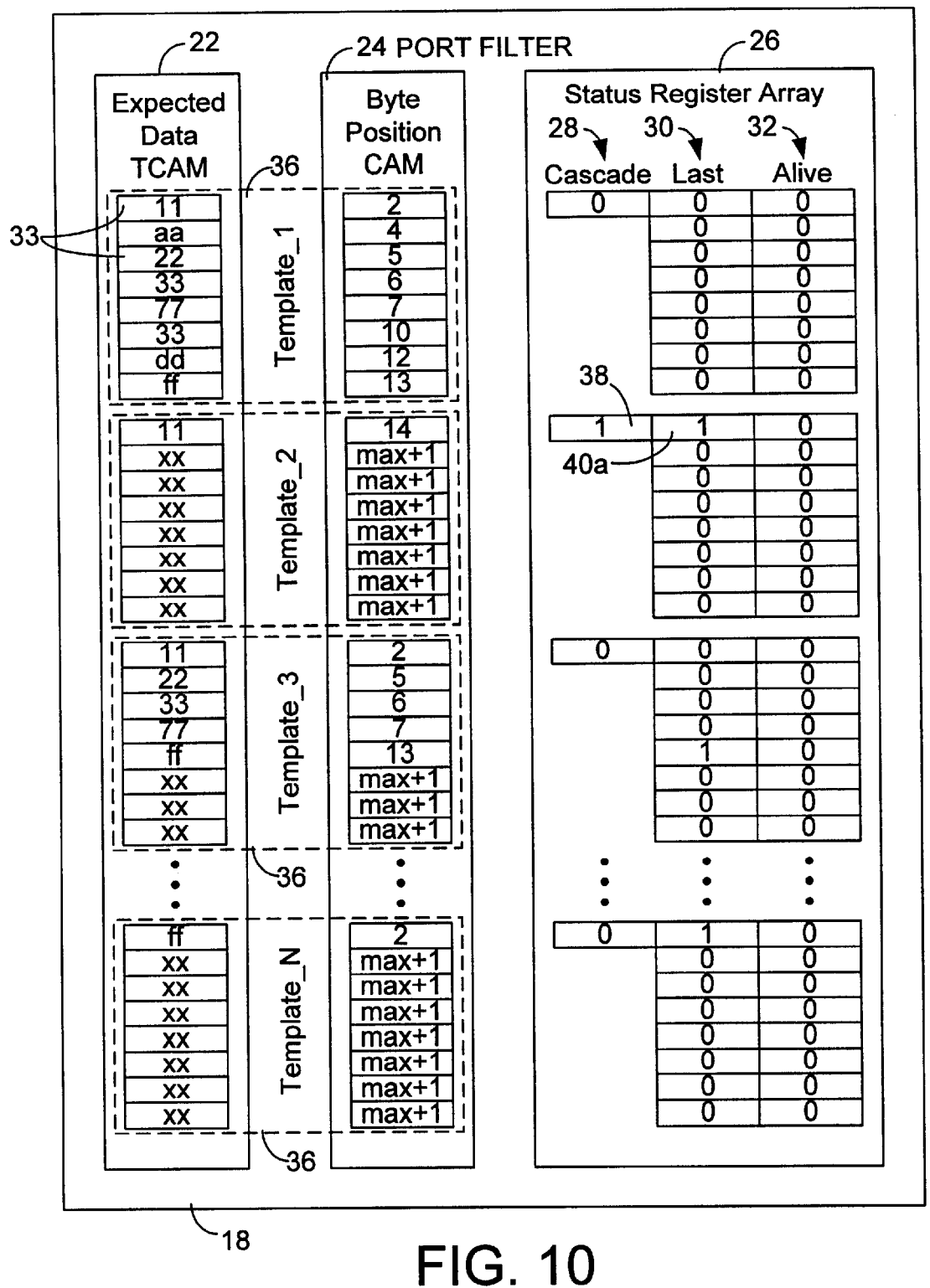
FIG. 10 is a schematic diagram of port filter memory components where a first template cascades into a second template.

Referring now to FIG. 10, an example port filter 18 is illustrated for when a user populates template_1 with more conditions than pairs of corresponding template entries 33, 34. In the example, the user has specified nine conditions and the template has eight entry pairs. In this case, the processor 20 will set the cascade entry 38 for template_2 to logical one and uses the first entries 33, 34 of template_2 for the extra condition specified by the user. This also closes off the user's access to template_2 for the conditions for identifying another target data packet with template_2. As the data bytes are received by the port filter 18, the port filter logic 100 will follow the operating loop as illustrated in FIG. 3, regardless of the number of conditions in template_1 until the end of packet signal is received. Upon receiving end of packet signal, the port filter logic 100 will generate the evaluation result for all templates 36, and any cascaded templates will conceptually be treated as a single template.

Figure 11:
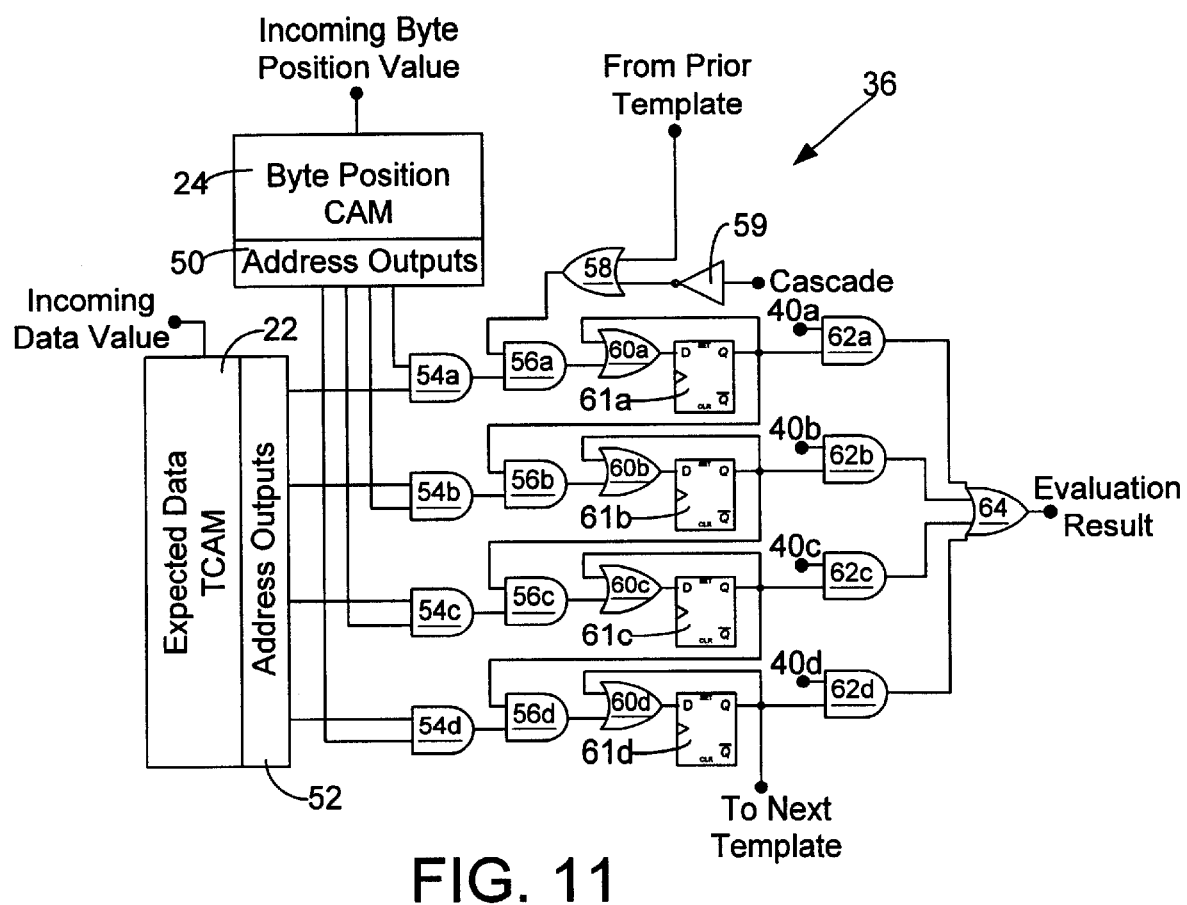
FIG. 11 is a schematic diagram of the port filter implemented with logic gates.

Referring to FIG. 11, the port filter 18 is implemented with logic gates. FIG. 11 illustrates an example template 36 being capable of storing four conditions. It is noted that this example logic gate implementation uses a series of cascaded latches to implement the alive array 32. However, one skilled in the art will appreciate that other logic gate implementations of the port filter 18 are possible.

When an incoming byte position value matches a value stored in one of the entries 34 of the byte position CAM 24, a corresponding address output 50 of the byte position CAM 24 will go high. Similarly, when an incoming data value matches a value stored in one of the entries 33 of the expected data TCAM 22, a corresponding address output 52 of the expected data TCAM 22 will go high.

The address outputs 50, 52 are respectively paired together and connected to inputs of a series of AND gates 54. The first of the AND gates 54, or AND gate 54a, has inputs connected to the address outputs 50, 52 corresponding to the first condition stored in the expected data TCAM 22 and the byte position CAM 24. AND gates 54b, 54c and 54d respectively are connected to the address outputs 50, 52 corresponding to the second, third and fourth conditions.

The output of AND gates 54a to 54d are respectively connected to first inputs of cascading status value AND gates 56a to 56d. A second input of AND gate 56a receives an enabling signal which provides an initial alive/dead indication for the template 36. The enabling signal is the output from an OR gate 58. The inputs of the OR gate 58 are an inverted value from the cascade entry 38 (generated by inverter 59) associated with the template 36 and a cascading status value from a prior adjacent template. The generation of the cascading status value by the prior adjacent template is conducted in same manner as described below for the cascading status value output to the next template generated by the illustrated template 36. It is noted that if the template 36 is the first template, then the enabling signal can simply be an inverted value of the bit value stored by the cascade entry 38.

The outputs of the cascading status value AND gates 56a to 56d are respectively connected to a first input of cascading status value OR gates 60a to 60d. Outputs of the cascading value OR gates 60a to 60d are respectively connected inputs of alive array latches 61a to 61d. More specifically, the alive array latches 61a to 61d are D type flip-flops and the outputs of the cascading value OR gates 60a to 60d are respectively connected the D inputs of the flip flops. The latches 61a to 61d are clocked by a clock (not shown) have a frequency at least as high as the data byte rate. Outputs of each latch 61a to 61d , or the Q outputs, are respectively connected to second inputs of the cascading status value OR gates 60a to 60d . The Q outputs are also respectively connected to the second input of the subsequent cascading status value AND gates 56b to 56d. The Q output of the last latch 60d for the template is provided to the next template as a cascading status value so that the next template can determine the alive/dead status of the template 36 if the next template has been cascaded, or logically combined, with the template 36. The Q outputs of the latches 61a to 61d are also respectively connected to inputs of match identifying AND gates 62a to 62d. Each match identifying AND gate 62a to 62d also has an input connected to the entries 40a to 40d of the last array 30. Outputs of the AND gates 62a to 62d are connected to inputs of an OR gate 64.

If a condition match (FIG. 3, step 104) has occurred for the first condition, the output of AND gate 54a will go high. Assuming the template is alive (i.e., the enabling signal has a logical high value), then the output of AND gate 56a will go high also causing the output of OR gate 60a to go high. At the next triggering edge of the clock cycle, the output of the latch 61a will go high. Feeding the output of the latch 61a back to the second input of the OR gate 60a will cause the latch to maintain a high output until the latch 61a is reset. The output of the latches 61a to 61d represent the alive array 32. Therefore, it is desirous to maintain a high output when a condition match occurs until the end of packet is reached. Otherwise, when the template 36 acts upon the next data byte, the output of AND gates 54a and 56a will go low causing the output of the latch 61a to go low without storing the appropriate alive/dead value. In an alternative implementation, the OR gates 60a to 60d can be eliminated and the output of AND gates 56a to 56d can be connected to the clock inputs of the latches 61a to 61d. For this alternative implementation, the D inputs of the latches 61a to 61d would be connected to logical high and the latches 61a to 61d, if triggered by a condition match output from AND gate 56a to 56d, would hold their output until reset.

The foregoing logic is cascaded through the template 36 for each corresponding pairs of entries 33, 34. One skilled in the art will appreciate that a match of any corresponding pair entries will be determined by AND gates 54a to 54d. Therefore, if matches for all the conditions up to and including the condition associated with the last entry 40a to 40d which has been set to logical high have occurred, then the corresponding output of the AND gate 62a to 62d will go high. When one of the outputs of the AND gates 62a to 62d goes high, an output of the OR gate 64 will go high indicating the arrival of a target data packet. Once all of the data bytes for an incoming data packet have been processed, the output of the OR gate 64 is strobed, or sampled, to determine whether a target data packet has been identified by the template 36. The output of the OR gate 64 can be used directly as the evaluation result for the template 36 or can be connected to a device for outputting the evaluation result containing a value associated with the template 36, the target data packet identified or the like. In addition, once all of the data bytes for an incoming data packet have been processed, the latches 61a to 61d are reset, allowing the template 36 to evaluate subsequent data packets.

The block diagrams and flow chart of FIGS. 1, 2 and 3 show the architecture, functionality, and operation of an implementation of the port filter 18 and the processor 20. If embodied in software, each block may represent a module, segment, or portion of code that comprises one or more executable instructions to implement the specified logical function(s). If embodied in hardware, each block may represent a circuit or a number of interconnected circuits to implement the specified logical function(s). Although the flow chart of FIG. 3 shows a specific order of execution, it is understood that the order of execution may differ from that which is depicted. For example, the order of execution of two or more blocks may be altered relative to the order shown. Also, two or more blocks shown in succession may be executed concurrently or with partial concurrence. It is understood that all such variations are within the scope of the present invention.

Although particular embodiments of the invention have been described in detail, it is understood that the invention is not limited correspondingly in scope, but includes all changes, modifications and equivalents coming within the spirit and terms of the claims appended hereto.

What is claimed is:

1. A method of identifying a target data packet from a series of data packets being received or transmitted by a communications device, each data packet having a series of data values, comprising the steps of:
   (a) establishing at least one condition for the target data packet, each of the at least one condition specifying a particular data value being located in a particular position of the target data packet;
   (b) determining whether a present data value from a data packet is located in the particular position specified by any of the at least one condition and generating a position match indicator;
   (c) determining whether the present data value contains the particular data value specified by any of the at least one condition and generating a data value match indicator;
   (d) comparing the position match indicator for the present data value and the data value match indicator for the present data value and generating a positive condition match indicator for the present data value when both the position match indicator and the data value match indicator are positive; and
   (e) generating a positive evaluation result indicative of the presence of the target data packet when an alive indicator associated with a last condition match indicator of the present data value is alive, the alive indicator associated with a last condition match indicator being alive when a last condition and any preceding conditions of the at least one condition have sequentially been satisfied by the data packet and the data packet thereby having generated a positive match indicator for each of the at least one condition.

2. The method according to claim 1, further comprising the steps of:
   storing a value related to the particular position in a first content addressable memory, the first content addressable memory receiving a value related to the position of the data value and the first content addressable memory generating the position match indicator; and
   storing the particular data value in a second content addressable memory, the second content addressable memory receiving the data value and the second content addressable memory generating the data value match indicator.

3. The method according to claim 2, wherein the second content addressable memory is a ternary content addressable memory.

4. The method according to claim 1, further comprising the steps of:
   establishing criteria related to the target data packet, and
   translating the criteria into a the particular data value and associated particular position to derive the at least one condition used to identify the target data packet.

5. The method according to claim 1, wherein the particular position is a byte position of the data values.

6. The method according to claim 1, wherein steps (b) and (c) are conducted independently of one another and simultaneously for each present data value.

7. The method according to claim 1, further comprising the step of strobing the evaluation result upon the receipt of an end of packet indication.

8. A method of identifying a target data packet from a series of data packets being received or transmitted by a communications device, each data packet having a series of data values, comprising the steps of:
   establishing a plurality of conditions for the target data packet, each condition having a particular data position value and an associated particular data value;
   storing associated particular data position values and particular data values from the conditions in associated pairs of content addressable memory addresses, each pair of addresses having a first address located in a first content addressable memory and a second address located in a second content addressable memory, the first content addressable memory receiving a value related to a data position of a data value and the first content addressable memory generating a position match indicator, and the second content addressable memory receiving the data value and the second content addressable memory generating a data value match indicator;
   comparing the position match indicator and the data value match indicator to determine if one of the conditions for the target data packet has been satisfied by the transmitted data value; and
   updating an alive register having a series of values, each value associated with one of the pair of addresses being used to store each of the conditions, each value of the alive register based on an associated value of the comparison of the position match indicator and the data value match indicator.

9. The method according to claim 8, wherein the second content addressable memory is a ternary content addressable memory.

10. The method according to claim 8, further comprising the step of grouping pairs of addresses from the first and second content addressable memories into at least one template.

11. The method according to claim 10, further comprising the step of setting a cascade value for each template, the cascade value being selectable to combine a pair of templates if a number of conditions for the target data packet exceeds the number of grouped pairs of addresses for a first of the paired templates.

12. The method according to claim 8, further comprising the step of setting a last register associated with a pair of addresses being used to store a last of the conditions for identifying the target data packet.

13. The method according to claim 12, further comprising the step of strobing a comparison of the set last register and an alive register value associated with the set last register upon receipt of an end of packet indication to determine whether the target data packet was received or transmitted by the communications device.

14. The method according to claim 8, wherein the value of each alive register is dependent on the value of the previous alive resister.

15. The method according to claim 14, further comprising the steps of monitoring the value of a last register to determine when a data value having a position matching the particular data position contained in a last of the plurality of conditions has been received or transmitted, and generating an evaluation result indicating whether the target data packet has been received based on the value of the alive register associated with the last register.

16. The method according to claim 8, further comprising the steps of:

establishing criteria related to the target data packet, and translating the criteria into the particular data value and the associated particular data position to derive the condition.

17. The method according to claim 8, wherein the particular data position value corresponds to a byte position of the data values.

18. The method according to claim 8, further comprising the step of strobing at least one value of the alive register upon receipt of an end of packet indication to determine whether the target data packet was received or transmitted by the communications device.

19. A port filter for identifying at least one target data packet from a plurality of data packets comprising:

a first content addressable memory having a plurality of entries, the first content addressable memory storing a position value in each of the plurality of entry addresses;

a second content addressable memory having a plurality of entries, the second content addressable memory storing an expected data value in each of the plurality of entry addresses, the entries of the first content addressable memory and the second content addressable memory being logically paired such that the values stored in each pair of entries correspond to a condition used to identify the at least one target data packet; and an alive indication memory, the alive indication memory being progressively updated as a data packet is being received or transmitted to indicate whether each condition has been satisfied by the received or transmitted data packet.

20. The port filter according to claim 19, wherein each data packet consists of a series of data values, the port filter determining whether the data values of the incoming data packets match the conditions to determine if the expected data values are present in associated data value positions of the data packet.

21. The port filter according to claim 19, wherein the second content addressable memory is a ternary content addressable memory.

22. The port filter according to claim 19, wherein associated sets of entry addresses from the first content addressable memory and the second content addressable memory are grouped into templates.

23. The port filter according to claim 22, wherein each template has a cascade register, a value of the cascade register being selectable to combine a pair of templates if a set of conditions for one template has more conditions than pairs of entries.

24. The port filter according to claim 19, further comprising a last register for each pair of entries, a value of each last register being selectable to indicate which pair of associated entries is being used to store a last of a set of conditions for identifying the target data packet.

25. The port filter according to claim 19, wherein the alive indication memory include an alive register for each pair of entries, a value of each alive register being selectable to indicate if a data value matching an associated condition has been received by the port filter.

26. The port filter according to claim 25, wherein the value of each alive register is dependent on the value of the previous alive register.

27. The port filter according to claim 19, wherein the port filter is associated with a communications port of a data packet switch.

28. The port filter according to claim 19, further comprising a processor, the processor receiving criteria related to the target data packet from a user and the processor populating the first and second content addressable memories with values to establish a template of conditions used to identify the target data packet.

29. The port filter according to claim 19, wherein the port filter generates an evaluation result for each incoming data packet, the evaluation result indicative of whether each incoming data packet is the at least one target data packet.

* * * * *